Patented Aug. 22, 1939

2,170,016

UNITED STATES PATENT OFFICE 2,170,016

MIXED ESTERS OF CELLULOSE CONTAINING UNSATURATED ACID RADICALS

Charles R. Fordyce and Gordon D. Hiatt, Rochester, N. Y., assignors to Eastman Kodak Company, Rochester, N. Y., a corporation of New Jersey No Drawing. Application March 17, 1938, Serial No. 196,471

5 Claims. (Cl. 260—225)

The present invention relates to cellulose esters prepared by esterifying a cellulose derivative containing free and esterifiable hydroxyl groups with a bath containing higher saturated acid groups and higher unsaturated acid groups. The esters, containing these higher acid groups, may be converted into insoluble products resistant to moisture, oil, organic solvents and the like.

It has been previously recognized that unsaturated acid esters of cellulose could be converted into insoluble products by light or heat. In these cases, however, the unsaturated radicals used had but a small amount of carbon atoms. The esters containing higher acid radicals are more resistant to the action of moisture than those whose acyl content consists of lower acid radicals, however, they are also more susceptible to insolubilization. Such action might even occur during the esterification, thus resulting in a gummy product.

One object of our invention is to prepare esters having an exceptionally high degree of resistance to moisture and oil. Another object of our invention is to control the degree of susceptibility of the cellulose ester to heat and light, and to provide a product which will provide a high degree of protection to objects which have been coated therewith. Other objects will appear herein.

We have found that, if a cellulose derivative, having free and esterifiable hydroxyl groups, is esterified in a bath in which at least one and not more than nine parts of higher saturated acyl is present for every part of unsaturated acyl, excessive gumming is avoided and an ester is obtained which is readily soluble in various organic solvents and which can be insolubilized by heat or light. The cellulose derivative which is employed, as the starting material, should have sufficient esterifiable hydroxyls so that at least 20% of higher acyl is present in the final product. It is preferred that the higher acyl content of the final product be greater than 25% in order to get better solubility in organic solvents, such as butyl or amyl acetate, toluene-alcohol, propylene chloride, etc. The esterification of the cellulose derivative may be accomplished by various esterification baths such as those containing: (1) both acids together with an impelling anhydride, such as chloracetic anhydride; (2) a mixture of the anhydrides of the acids; (3) an anhydride of one acid and the other acid as such; (4) the acid chlorides of the acids with a tertiary organic base, such as pyridine. If desired the higher saturated acid radical may be put on first before esterifying with the unsaturated acyl. If the starting material is cellulose acetate, it must have an acetyl content not greater than the acetone soluble range. As a rule, a cellulose acetate, having an acetyl content of not more than 40%, is satisfactory for use as the starting material. If the cellulose ester employed as the starting material has been fully esterified and then hydrolyzed a more homogeneous product is obtained than where an ester prepared by partial esterification is employed.

The higher saturated acid employed should be one having not less than 12 carbon atoms. It is preferred that the acid have not more than 18 carbon atoms for if an acid above this be employed, it might cause softness or waxiness in the final product unless present in a small proportion. The saturated acids, which may be used, are the fatty acids, either substituted or unsubstituted, within the 12–18 carbon atom range. Some aromatic acids, such as butyl phthalic acid and benzoyl benzoic acid, would be suitable for use as saturated acids. These may be considered as saturated acids due to the absence of drying oil behavior therein.

The term "unsaturated acids," includes only those acids which contain ethylenic double bonds and are characterized by drying oil behavior. The unsaturated acids which may be employed are any having over ten carbon atoms. Any of the unsaturated fatty acids, whether having one or several unsaturated bonds, may be employed in our process. Some of the unsaturated acids, which may be employed, are aleic acid, linoleic acid, linolenic or the acids derived from linseed oil, castor oil, soya bean oil, cotton seed oil or other oils containing them. Acids, which are commercially listed as drying or semi-drying acids may be employed in our process.

The unsaturated acids differ in their characteristics and the particular acid, which is to be used, depends on the characteristics desired by the individual operator. Oleic acid, for example, is not as readily susceptible to auto-saturation, i. e. insolubilization, as some other acids but the product prepared therewith usually has a high flexibility. The tendency to gum during the esterification is greater with linoleic acid than with oleic acid. That unsaturated acids exhibit different degrees of susceptibility to the drying operation is commonly recognized and in fact, acids might have the same degree of unsaturation but yet differ in reactivity or susceptibility to saturation. In a process in accordance with our invention gumming does not occur, even in the presence of air, when only a small proportion of unsaturated acid is employed and the reaction time is not very long. However, under some conditions, especially when the reaction takes more than one hour, it is desirable that the esterification be carried out in an oxygen-free atmosphere, as described and claimed in Malm and Hiatt application Serial No. 196,472, filed of even date. It is, also, preferred that the practice described in that patent of drying either in the absence of oxygen or the presence of an anti-oxidant be followed in order to prevent any insolubilization occurring.

It is also preferred in our process that an unsaturated acid, which has not been exposed to the air for any considerable time, be employed, since an unsaturated acid which has been allowed to stand in the presence of oxygen appears to promote the gumming or insolubilization in the esterification, especially if it is continued for a very long time, such as more than one hour. The fitness of the unsaturated acid for use in our process is indicated by subjecting it to a peroxide test. For instance, if the acid shows a peroxide content of more than .01 in this test, it would tend to promote gumminess or saturation of the ester formed, whereas an acid, showing a peroxide content of not more than .01 and preferably somewhat less, would be more satisfactory. For instance, an old unsaturated acid, which showed a peroxide content of .139%, was employed in one process embodying our invention, and gumming to an objectionable degree occurred. However, when a fresh acid, having a peroxide content of .0068%, was employed, gumming did not occur even though the reaction was carried out for 3–4 hours.

The content of peroxide may be determined as follows:

150 c. c. of 2 normal sulfuric acid is added to a 250 c. c. Erlenmeyer flask and the air is thoroughly expelled with $CO_2$ or $N_2$. 10 gms. of the unsaturated acid to be tested is added and the flask is again subjected to a de-aeration. 15 c. c. of 10% potassium iodide solution and 3–5 drops of 1% ammonium molydate is then added. The iodine liberated is determined by titrating with a standard thiosulfate solution using starch for an indicator. The per cent of peroxide may be calculated according to the following formula:

$$\text{Percent peroxide} = \frac{\text{c. c. of } NNa_2S_2O_3 \times \text{mol. wt. of peroxide}}{\text{Wt. of sample} \times 20}$$

The molecular weight of oleic acid when that is taken as the sample plus 16 for the oxygen, which has satisfied the double bond, is taken as the molecular weight of the peroxide. If some other unsaturated acid is employed the molecular weight of the peroxide is taken as the molecular weight of the acid plus 16 for the oxygen which satisfies the double bond resulting in a peroxide structure.

The proportion of saturated to unsaturated groups, employed in the esterification, is determined by various factors. For instance, the lower limit of unsaturated acid, which will be used, is that amount which will give a product which can be polymerized or insolubilized and which will not be too low in melting point, too soft, or too susceptible to swelling by organic liquids with which it may come in contact, such as lubricating oils. The upper limit is governed by the tendency to polymerize during the esterification and by the degree of brittleness and discoloration of the resulting product after insolubilization has occurred. We have found that the most suitable proportion of the higher acids or acyls for use in our process in the esterification bath is approximately two parts of saturated acyl to one part of unsaturated acyl. With this proportion, the esterification proceeds satisfactorily without gumming or the forming of rubbery deposits in the bath and yet the resulting product is readily suitable to later insolubilization. It is preferred that the product, prepared by our process, contain at least 4% and not more than 19% of combined unsaturated acid. With two parts of saturated to one part of unsaturated acid, in the esterification bath there will be approximately 16.6% of unsaturated acid in the final ester, all calculated on the basis of the acid.

As starting materials cellulose esters of the lower fatty acids, such as acetic, propionic and/or butyric, having acyl contents of not more than 40%, or cellulose ethers, having a corresponding amount of free and esterifiable hydroxyl groups, may be employed. The following examples illustrate the preparation of cellulose esters containing unsaturated acyls in accordance with our invention:

*Example I*

100 parts of cellulose acetate, having an acetyl content of 38%, was dissolved in a mixture of 200 parts of ethylene chloride and 200 parts of chloroacetic anhydride at 65–70° C. A mixture of 75 parts of stearic acid, 75 parts of oleic acid and 5 parts of magnesium perchlorate was added thereto and the mass was stirred while holding the temperature at 65–70° C. for one hour. The mass was then cooled and the cellulose ester was precipitated by pouring into methyl alcohol and extracting with methyl alcohol to remove the uncombined acid. The product was soluble in acetone, ethylene dichloride and ethyl acetate. It was found to be susceptible to insolubilization in solid form upon heating or exposure to light.

*Example II*

The process of the previous example was repeated except that a mixture of 100 parts of stearic acid and 50 parts of linseed oil acid was added instead of the mixture of stearic and oleic acids. The resulting product was found to be soluble in amyl acetate, propylene chloride, acetone and benzene-methyl alcohol. Films of this ester, coated from these solvents, were rapidly converted into insolubility upon exposure to sunlight, however, they were still flexible and transparent. When heated at 110° C., a freshly coated film of this ester became completely insoluble in all solvents in two hours.

*Example III*

100 parts of cellulose acetate, having an acetyl content of 36% was dissolved in a mixture of 400 parts of pyridine and 100 parts of chlorobenzene. A mixture of 50 parts of stearyl chloride and 50 parts of oleyl chloride was added and the mass was refluxed for approximately 12 hours. It was precipitated and extracted with methyl alcohol and dried. The resulting product was found to be susceptible to insolubilization by the action of heat or light. These esters may also be insolubilized or converted upon standing in the air, although it is preferable that heat or ultra-violet light be present in order to hasten the conversion. Drying accelerators such as those commonly used with drying oils may be employed.

The esters of our invention may be employed for any purpose in which a coating or film is desirable, particularly where high resistance to penetration by liquid is important. For instance, where a conductor of electricity is exposed to liquids, such as water or oil, such as in the open or in transformers, these esters are quite useful. The electrical conductor may be coated with the ester while it is dissolved in a solvent and after its application thereto, the coating may be converted by heat or light, thereby forming an impermeable coating thereon. These esters are also useful for coatings of metals or other materials which might be effected by the action of acids or alkalies. They are also useful for application of thin coatings to containers of liquids whether aqueous or non-aqueous. They are also of value for the coating of objects which are subjected to submersion, such as in oceanographic work.

The cellulose esters having higher saturated acyl radicals, such as cellulose acetate stearate, have been considered for use in lacquers due to their high moisture resistance but these coatings are not resistant to scratching. By combining stearyl and unsaturated acyl in the proportions given, an ester is obtained which may be employed for preparing a lacquer giving coatings having a high resistance to moisture and a hardness when insolubilized which resists scratching.

We claim:

1. A cellulose ester the acyl content of which essentially consists of lower fatty acid groups, saturated organic acid groups of at least 12 carbon atoms and unsaturated organic acid groups having drying characteristics, the unsaturated and the higher saturated organic acid groups constituting at least 20% of the ester, the unsaturated groups being at least 4% of the ester but insufficient to cause polymerization during the esterification.

2. A cellulose acetate-higher acylate, the acyl content of which essentially consists of acetyl, saturated organic acid groups of at least 12 carbon atoms and unsaturated organic acid groups having drying characteristics, the unsaturated and the higher saturated organic acid groups consisting at least 20% of the ester, the unsaturated groups being at least 4% of the ester but insufficient to cause polymerization during the esterification.

3. A cellulose acetate-linoleate stearate of which the linoleate-stearate portion of the ester constitutes at least 25% thereof, the linoleyl being 4–19% of the ester.

4. A cellulose acetate-oleate-stearate of which the oleyl-stearyl portion constitutes at least 25% of the ester, the oleyl being 4–19% of the ester.

5. A process of preparing a cellulose derivative susceptible to insolubilization which comprises reacting upon a cellulose ester having free and esterifiable hydroxyl groups with an esterification mixture, the esterifying acyl of which consists of saturated organic acid groups of at least 12 carbon atoms and unsaturated organic acid groups of at least 10 carbon atoms.

CHARLES R. FORDYCE.
GORDON D. HIATT.

CERTIFICATE OF CORRECTION.

Patent No. 2,170,016.            August 22, 1939.

CHARLES R. FORDYCE, ET AL.

It is hereby certified that error appears in the printed specification of the above numbered patent requiring correction as follows: Page 3, second column, line 12-13, claim 2, for the word "consisting" read constituting; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.

for any purpose in which a coating or film is desirable, particularly where high resistance to penetration by liquid is important. For instance, where a conductor of electricity is exposed to liquids, such as water or oil, such as in the open or in transformers, these esters are quite useful. The electrical conductor may be coated with the ester while it is dissolved in a solvent and after its application thereto, the coating may be converted by heat or light, thereby forming an impermeable coating thereon. These esters are also useful for coatings of metals or other materials which might be effected by the action of acids or alkalies. They are also useful for application of thin coatings to containers of liquids whether aqueous or non-aqueous. They are also of value for the coating of objects which are subjected to submersion, such as in oceanographic work.

The cellulose esters having higher saturated acyl radicals, such as cellulose acetate stearate, have been considered for use in lacquers due to their high moisture resistance but these coatings are not resistant to scratching. By combining stearyl and unsaturated acyl in the proportions given, an ester is obtained which may be employed for preparing a lacquer giving coatings having a high resistance to moisture and a hardness when insolubilized which resists scratching.

We claim:

1. A cellulose ester the acyl content of which essentially consists of lower fatty acid groups, saturated organic acid groups of at least 12 carbon atoms and unsaturated organic acid groups having drying characteristics, the unsaturated and the higher saturated organic acid groups constituting at least 20% of the ester, the unsaturated groups being at least 4% of the ester but insufficient to cause polymerization during the esterification.

2. A cellulose acetate-higher acylate, the acyl content of which essentially consists of acetyl, saturated organic acid groups of at least 12 carbon atoms and unsaturated organic acid groups having drying characteristics, the unsaturated and the higher saturated organic acid groups consisting at least 20% of the ester, the unsaturated groups being at least 4% of the ester but insufficient to cause polymerization during the esterification.

3. A cellulose acetate-linoleate stearate of which the linoleate-stearate portion of the ester constitutes at least 25% thereof, the linoleyl being 4–19% of the ester.

4. A cellulose acetate-oleate-stearate of which the oleyl-stearyl portion constitutes at least 25% of the ester, the oleyl being 4–19% of the ester.

5. A process of preparing a cellulose derivative susceptible to insolubilization which comprises reacting upon a cellulose ester having free and esterifiable hydroxyl groups with an esterification mixture, the esterifying acyl of which consists of saturated organic acid groups of at least 12 carbon atoms and unsaturated organic acid groups of at least 10 carbon atoms.

CHARLES R. FORDYCE.
GORDON D. HIATT.

CERTIFICATE OF CORRECTION.

Patent No. 2,170,016. August 22, 1939.

CHARLES R. FORDYCE, ET AL.

It is hereby certified that error appears in the printed specification of the above numbered patent requiring correction as follows: Page 3, second column, line 12-13, claim 2, for the word "consisting" read constituting; and that the said Letters Patent should be read with this correction therein that the same may conform to the record of the case in the Patent Office.

Signed and sealed this 3rd day of October, A. D. 1939.

(Seal)

Henry Van Arsdale,
Acting Commissioner of Patents.